United States Patent
Sterzel

(10) Patent No.: US 7,208,135 B2
(45) Date of Patent: *Apr. 24, 2007

(54) PREPARATION OF MIXED OXIDES HAVING MEAN DIAMETERS OF LESS THAN 10 NANOMETERS

(75) Inventor: Hans-Josef Sterzel, Dannstadt-Schauernheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 275 days.

This patent is subject to a terminal disclaimer.

(21) Appl. No.: 10/847,620

(22) Filed: May 18, 2004

(65) Prior Publication Data

US 2004/0235640 A1 Nov. 25, 2004

(30) Foreign Application Priority Data

May 23, 2003 (DE) ................. 103 23 816

(51) Int. Cl.
*C01G 1/00* (2006.01)

(52) U.S. Cl. ............. 423/593.1; 423/598; 423/594.12; 423/594.8; 423/594.15; 423/594.16; 423/594.14; 423/600; 423/263; 423/594.9; 423/594.7; 977/811

(58) Field of Classification Search ............ 977/811, 977/932; 423/592.1, 593.1, 598, 594.12, 423/594.8, 594.15, 594.16, 594.14, 600, 423/263, 594.9, 594.7; 501/134, 135, 136, 501/137, 138, 139; 361/321.1, 321.2, 321.4, 361/321.5; 257/295

See application file for complete search history.

(56) References Cited

U.S. PATENT DOCUMENTS

| | | | | |
|---|---|---|---|---|
| 386,923 A | | 7/1888 | Jeenel | |
| 3,647,364 A | * | 3/1972 | Mazdiyasni et al. | ........ 423/598 |
| 3,923,675 A | | 12/1975 | Mazdiyasnl et al. | ....... 252/62.9 |
| 4,968,498 A | * | 11/1990 | Wautier et al. | ......... 423/593.1 |
| 5,017,534 A | | 5/1991 | Chaput et al. | |
| 5,087,437 A | * | 2/1992 | Bruno et al. | ................ 423/598 |
| 5,342,648 A | * | 8/1994 | MacKenzie et al. | ..... 427/126.3 |
| 5,445,806 A | | 8/1995 | Kinugasa et al. | |
| 5,554,571 A | * | 9/1996 | Okabe et al. | ................ 501/138 |
| 6,162,752 A | * | 12/2000 | Kawamoto et al. | ......... 501/137 |
| 6,284,216 B1 | * | 9/2001 | Sakai et al. | ................ 423/598 |
| 2001/0008866 A1 | * | 7/2001 | Kawamoto et al. | ......... 501/136 |
| 2003/0022784 A1 | * | 1/2003 | Kawamoto et al. | ......... 501/137 |
| 2003/0215384 A1 | | 11/2003 | Sterzel | |

FOREIGN PATENT DOCUMENTS

| | | |
|---|---|---|
| EP | 1 362 830 | 11/2003 |
| GB | 2 193 204 | 2/1988 |
| JP | 2002060219 A * | 2/2002 |
| WO | WO 02/42201 | 5/2002 |

OTHER PUBLICATIONS

Materials Physics and Mechanics (2002), 4(2), 107-110 Ding et al.
Silicate Industriesl, 1984,49(10)211-216, Vidrio.

* cited by examiner

*Primary Examiner*—Timothy C. Vanoy
(74) *Attorney, Agent, or Firm*—Novak Druce & Quigg LLP

(57) ABSTRACT

Process for preparing mixed oxides by reacting alkoxides of the elements titanium, zirconium, niobium, tantalum or mixtures thereof with metal hydroxides, metal carboxylates, metal hydroxycarbonates, metal carbonates or mixtures thereof of the elements lithium, sodium, potassium, magnesium, calcium, strontium, barium, zinc, cadmium, aluminum, gallium, yttrium, lanthanum, praseodymium, neodymium, samarium, dysprosium, europium, lead, bismuth or mixtures thereof in a $C_1$–$C_8$-alkanol, in a glycol ether or in a mixture thereof at from 50 to 200° C.

5 Claims, No Drawings

PREPARATION OF MIXED OXIDES HAVING MEAN DIAMETERS OF LESS THAN 10 NANOMETERS

The present invention relates to a process for preparing mixed oxides by reacting alkoxides of titanium, zirconium, niobium or tantalum with metal hydroxides, metal carboxylates, metal hydroxycarbonates, metal carbonates of other elements of the Periodic Table of the Elements in an alcohol or a glycol ether at elevated temperature.

The preparation of lanthanum titanates from lanthanum nitrate and titanium alkoxides is known from Materials Physics and Mechanics (2002), 4(2), pages 107 to 110.

GB-A-2,193,204 discloses the preparation of amorphous lanthanum-lead-titanium-zirconium oxides using lead alkoxides, by crystallization at elevated temperatures.

U.S. Pat. No. 3,923,675 discloses the preparation of lanthanum-lead-titanium-zirconium oxides by hydrolysis of the alkoxides. The process leads to particles having a site of from 7.5 to 30 nm.

The preparation of lanthanum-lead-titanium-zirconium oxides from lead acetate and lanthanum acetate and zirconium alkoxide and titanium alkoxide by basic hydrolysis and subsequent calcination is known from Silicate Industriels (1984), 49(10), pages 211 to 216.

Disadvantages of these processes are the size of the particles obtained and the residual carbon content.

It is an object of the present invention to remedy the abovementioned disadvantages.

We have found that this object is achieved by a new and improved process for preparing mixed oxides, which comprises reacting alkoxides of the elements titanium, zirconium, niobium, tantalum or mixtures thereof with metal hydroxides, metal carboxylates, metal hydroxycarbonates, metal carbonates or mixtures thereof of the elements lithium, sodium, potassium, magnesium, calcium, strontium, barium, zinc, cadmium, aluminum, gallium, yttrium, lanthanum, praseodymium, neodymium, samarium, dysprosium, europium, lead, bismuth or mixtures thereof in a $C_1$–$C_8$-alkanol, in a glycol ether or in a mixture thereof at from 50 to 200° C.

The process of the present invention can be carried out as follows:

Alkoxides of the elements titanium, zirconium, niobium, tantalum or mixtures thereof can be initially charged in a $C_1$–$C_8$-alkanol, in a glycol ether or a mixture thereof and reacted at from 50 to 200° C., preferably from 60 to 180° C., particularly preferably from 70 to 160° C., in particular from 75 to 150° C., and a pressure of from 0.1 to 3 bar, preferably from 0.5 to 2 bar, particularly preferably at atmospheric pressure, and, if desired, under an inert gas atmosphere (nitrogen or argon) with metal hydroxides, metal carboxylates, metal hydroxycarbonates, metal carbonates or mixtures thereof of the elements lithium, sodium, potassium, magnesium, calcium, strontium, barium, zinc, cadmium, aluminum, gallium, yttrium, lanthanum, praseodymium, neodymium, samarium, dysprosium, europium, lead, bismuth or mixtures thereof and, if desired, an organic or inorganic acid, preferably an organic acid, particularly preferably a carboxylic acid such as formic acid, acetic acid, propionic acid, in particular acetic acid.

The concentration of the alcoholic alkoxide solution can be varied within wide limits. The concentration is preferably from 50 to 800 g/liter, particularly preferably from 100 to 600 g/liter, in particular from 200 to 400 g/liter.

Suitable alkoxides are, for example, $C_1$–$C_8$-alkoxides, preferably $C_1$–$C_5$-alkoxides such as methoxides, ethoxides, n-propoxides, isopropoxides, n-butoxides, isobutoxides, sec-butoxides, tert-butoxides, n-pentoxides and isopentoxides, particularly preferably $C_1$–$C_4$-alkoxides such as methoxides, ethoxides, n-propoxides, isopropoxides, n-butoxides, isobutoxides, sec-butoxides and tert-butoxides, in particular n-propoxides, isopropoxides, n-butoxides and isobutoxides, or mixtures thereof.

Suitable alcohols include $C_1$–$C_8$-alkanols, preferably $C_1$–$C_4$-alkanols such as methanol, ethanol, n-propanol, isopropanol, n-butanol, isobutanol, sec-butanol or tert-butanol, particularly preferably $C_1$–$C_3$-alkanol such as methanol, ethanol, n-propanol or isopropanol, in particular methanol or ethanol.

Suitable glycol ethers include all known glycol ethers such as ethylene glycol monomethyl ether, ethylene glycol monoethyl ether, ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol monomethyl ether, diethylene glycol monoethyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether, diethylene glycol tert-butyl ether, preferably ethylene glycol monoethyl ether, ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol monoethyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether and diethylene glycol tert-butyl ether, particularly preferably ethylene glycol mono-n-propyl ether, ethylene glycol monoisopropyl ether, ethylene glycol mono-n-butyl ether, ethylene glycol monoisobutyl ether, ethylene glycol mono-sec-butyl ether, ethylene glycol tert-butyl ether, diethylene glycol mono-n-propyl ether, diethylene glycol monoisopropyl ether, diethylene glycol mono-n-butyl ether, diethylene glycol monoisobutyl ether, diethylene glycol mono-sec-butyl ether and diethylene glycol tert-butyl ether, in particular ethylene glycol monoisopropyl ether, ethylene glycol monoisobutyl ether, ethylene glycol tert-butyl ether, diethylene glycol monoisopropyl ether, diethylene glycol monoisobutyl ether and diethylene glycol tert-butyl ether.

In one advantageous embodiment, no additional water apart from the water from the hydrates used is introduced into the reaction.

In a preferred embodiment, part of the hydrates is replaced by anhydrous components.

If desired, doping elements such as Mg, Ca, Zn, Zr, V, Nb, Ta, Bi, Cr, Mo, W, Mn, Fe, Co, Ni, Pb, Ce or mixtures thereof, preferably Mg, Ca, Cr, Fe, Co, Ni, Pb or mixtures thereof, can be introduced, for example in the form of their hydroxides, oxides, carbonates, carboxylates or nitrates.

The mixed oxides prepared according to the present invention have a mean particle diameter of less than 10 nm, preferably from 0.5 to 9.9 nm, particularly preferably from 0.6 to 9 nm, in particular from 1 to 8 nm.

The mixed oxides are suitable as dielectrics or ferroelectrics and have relative dielectric constants of up to 5 000. They are suitable as dielectrics or ferroelectrics in capacitors, especially in ceramic capacitors.

It is possible to coat commercial metal foils such as nickel foils with the dispersions prepared according to the present invention in thicknesses of less than 0.5 mm, to vaporize the alcohol or glycol ether and, preferably in the absence of oxygen, produce a correspondingly thin mixed oxide layer on the metal foil and thus produce a wound capacitor.

EXAMPLES

Example 1

Under a nitrogen atmosphere, 110 g of anhydrous n-butyl glycol and 45.3 g (0.133 mol) of titanium tetra-n-butoxide and 25.3 g (0.133 mol) of lanthanum hydroxide were introduced while stirring and reacted at 135° C. for 92 hours. This gave a suspension of $La_2Ti_2O_7$ particles having a mean particle diameter of from 2 to 6 nm.

Example 2

Under a nitrogen atmosphere, 110 g of anhydrous n-butyl glycol and 22.4 g (0.066 mol) of titanium tetra-n-butoxide, 34.6 g (0.133 mol) of bismuth hydroxide and 20.8 g (0.066 mol) of barium hydroxide octahydrate were introduced while stirring and reacted at 120° C. for 48 hours. This gave a suspension of $Ba_2Bi_4Ti_5O_8$ particles having a mean particle diameter of from 3 to 6 nm.

Example 3

Under a nitrogen atmosphere, 110 g of anhydrous n-butyl glycol and 22.4 g (0.066 mol) of titanium tetra-n-butoxide, 25.3 g (0.066 mol) of zirconium tetra-n-butoxide, 25.3 g (0.133 mol) of lanthanum hydroxide and 50.4 g (0.133 mol) of lead acetate trihydrate were introduced while stirring and reacted at 140° C. for 116 hours. This gave a suspension of $PbLaZr_{0.5}Ti_{0.5}O_3$ particles having a mean particle diameter of from 2 to 5 nm.

Example 4

Under a nitrogen atmosphere, 110 g of anhydrous n-butyl glycol and 113.3 g (0.333 mol) of titanium tetra-n-butoxide, 28.4 g (0.075 mol) of lead acetate trihydrate, 14.2 g (0.075 mol) of lanthanum hydroxide and 34.1 g (0.533 mol) of acetic acid (100%) were introduced while stirring and reacted at 130° C. for 92 hours. This gave a suspension of $Pb_{0.5}La_{0.5}Ti_{1.25}O_{3.75}$ particles having a mean particle diameter of from 3 to 7 nm.

Example 5

Under a nitrogen atmosphere, 110 g of anhydrous n-butyl glycol and 17 g (0.05 mol) of titanium tetra-n-butoxide, 20.3 g (0.05 mol) of tantalum pentaethoxide, 39 g (0.15 mol) of bismuth hydroxide and 16 g (0.25 mol) of acetic acid (100%) were introduced while stirring and reacted at 140° C. for 116 hours. This gave a suspension of $Bi_3TaTiO_9$ particles having a mean particle diameter of from 4 to 8 nm.

I claim:

1. A process for preparing mixed oxide particles having a mean diameter of less than 10 nm, which comprises reacting alkoxides of the elements titanium, zirconium, niobium, tantalum or mixtures thereof with metal hydroxides, metal carboxylates, metal hydroxycarbonates, metal carbonates or mixtures thereof of the elements lithium, sodium, potassium, magnesium, calcium, strontium, barium, zinc, cadmium, aluminum, gallium, yttrium, lanthanum, praseodymium, neodymium, samarium, dysprosium, europium, lead, bismuth or mixtures thereof in a $C_1$–$C_8$-alkanol, in a glycol ether or in a mixture thereof at from 50 to 200° C.

2. The process of claim 1, which consists essentially of reacting the alkoxides with the metal hydroxides, metal carboxylates, metal hydroxycarbonates, metal carbonates or mixtures thereof, and separating the resulting mixed oxides from the $C_1$–$C_8$-alkanol and/or the glycol ether.

3. The process of claim 1, wherein the mean diameter of the oxide particles is less than 9.9 nm.

4. The process of claim 3, wherein the mean diameter of the oxide particles is less than 9 nm.

5. The process of claim 3, wherein the mean diameter of the oxide particles is less than 8 nm.

* * * * *